(12) United States Patent
Pendray et al.

(10) Patent No.: US 7,106,556 B2
(45) Date of Patent: Sep. 12, 2006

(54) SLIDER CONFIGURED FOR RAPID BEARING STABILIZATION DURING RAMP LOAD OPERATIONS

(75) Inventors: John Robert Pendray, Edina, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 149 days.

(21) Appl. No.: 10/602,370

(22) Filed: Jun. 24, 2003

(65) Prior Publication Data

US 2004/0264053 A1 Dec. 30, 2004

(51) Int. Cl.
*G11B 5/60* (2006.01)
(52) U.S. Cl. ............... 360/235.8; 360/236; 360/236.6
(58) Field of Classification Search ............ 360/235.4, 360/235.8, 236, 236.6
See application file for complete search history.

(56) References Cited

U.S. PATENT DOCUMENTS

| | | | |
|---|---|---|---|
| 3,855,625 A | 12/1974 | Garnier et al. | 360/103 |
| 4,218,715 A | 8/1980 | Garnier | 360/103 |
| 4,475,135 A | 10/1984 | Warner et al. | 360/103 |
| 4,553,184 A | 11/1985 | Ogishima | 360/103 |
| 4,616,180 A | 10/1986 | Compton | 324/309 |
| 4,646,180 A * | 2/1987 | Ohtsubo | 360/236.6 |
| 4,757,402 A | 7/1988 | Mo | 360/103 |
| 4,984,114 A | 1/1991 | Takeuchi et al. | 360/103 |
| 5,062,017 A | 10/1991 | Strom et al. | 360/103 |
| 5,086,360 A | 2/1992 | Smith et al. | 360/103 |
| 5,128,822 A | 7/1992 | Chapin et al. | 360/103 |
| 5,200,868 A | 4/1993 | Chapin et al. | 360/103 |
| 5,218,494 A | 6/1993 | Chapin et al. | 360/103 |
| 5,317,465 A | 5/1994 | Chapin et al. | 360/103 |
| 5,343,343 A | 8/1994 | Chapin | 360/103 |
| 5,359,480 A | 10/1994 | Nepela et al. | 360/103 |
| 5,490,026 A | 2/1996 | Dorius et al. | 360/103 |
| 5,508,862 A | 4/1996 | Lazzari et al. | 360/103 |
| 5,513,056 A | 4/1996 | Kawasaki et al. | 360/103 |
| 5,550,693 A | 8/1996 | Hendriks et al. | 360/103 |
| 5,624,581 A | 4/1997 | Ihrke et al. | 216/22 |
| 5,636,085 A | 6/1997 | Jones et al. | 360/103 |
| 5,737,151 A | 4/1998 | Bolasna et al. | 360/103 |
| 5,761,004 A | 6/1998 | Peck | 360/103 |
| 5,781,377 A | 7/1998 | Koka et al. | 360/103 |
| 5,796,551 A | 8/1998 | Samuelson | 360/103 |
| 5,940,249 A | 8/1999 | Hendriks | 360/103 |
| 5,953,181 A | 9/1999 | Utsunomiya | 360/103 |
| 5,963,396 A | 10/1999 | Burga et al. | 360/103 |
| 5,973,881 A | 10/1999 | Ajiki | 360/103 |
| 6,144,528 A | 11/2000 | Anaya-Dufresne et al. | 360/235.4 |
| 6,172,851 B1 | 1/2001 | Utsunomiya | 360/236.3 |

(Continued)

FOREIGN PATENT DOCUMENTS

EP 0 442 660 A2 2/1991

(Continued)

*Primary Examiner*—A. J. Heinz
(74) *Attorney, Agent, or Firm*—Westman, Champlin & Kelly

(57) ABSTRACT

A slider includes a longitudinal axis, a recessed region, a bearing surface, first and second elongated rails, and first and second elongated depressions. The first and second elongated rails extend generally parallel to the longitudinal axis and are disposed about the recessed region. Each of the first and second rails include a disc-facing surface that is recessed bearing surface. The first and second elongated depressions extend along the first and second rails, respectively. Each depression includes a depression floor that is recessed relative to the respective disc-facing surface.

30 Claims, 4 Drawing Sheets

U.S. PATENT DOCUMENTS

| | | | |
|---|---|---|---|
| 6,188,547 B1 | 2/2001 | Gui et al. | 360/236.5 |
| 6,246,538 B1* | 6/2001 | Kasamatsu et al. | 360/97.01 |
| 6,275,467 B1 | 8/2001 | Wang et al. | 369/300 |
| 6,311,388 B1 | 11/2001 | Berg et al. | 29/603.12 |
| 6,317,294 B1* | 11/2001 | Wada et al. | 360/235.6 |
| 6,333,835 B1 | 12/2001 | Kang et al. | 360/235.4 |
| 6,356,412 B1* | 3/2002 | Levi et al. | 360/237 |
| 6,462,909 B1 | 10/2002 | Boutaghou et al. | 360/235.8 |
| 6,466,410 B1* | 10/2002 | Polycarpou et al. | 360/236.6 |
| 6,510,027 B1 | 1/2003 | Chapin et al. | 360/235.8 |
| 6,678,119 B1 | 1/2004 | Pendray et al. | 360/236.6 |
| 2001/0053046 A1* | 12/2001 | Koishi | 360/236.2 |
| 2002/0001157 A1* | 1/2002 | Kang et al. | 360/236.3 |
| 2002/0008939 A1* | 1/2002 | Boutaghou et al. | 360/235.8 |
| 2006/0007597 A1* | 1/2006 | Kameyama | 360/235.8 |

FOREIGN PATENT DOCUMENTS

| | | |
|---|---|---|
| EP | 0 442 660 A3 | 2/1991 |
| EP | 0 442 660 B1 | 2/1991 |
| JP | 60242548 A | 12/1985 |
| JP | 01211383 A | 8/1989 |
| JP | 01245480 A | 9/1989 |
| JP | 01319188 A | 12/1989 |
| JP | 03132981 A | 6/1991 |

* cited by examiner

SLIDER CONFIGURED FOR RAPID BEARING STABILIZATION DURING RAMP LOAD OPERATIONS

FIELD OF THE INVENTION

The present invention relates to a slider for carrying a read/write transducer.

BACKGROUND OF THE INVENTION

Disc drives are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g., air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing: arm and a suspension. The suspension includes a load beam and a gimbal. The load beam provides a pre-load force to the slider, which forces the slider toward the disc surface. The gimbal is positioned between the slider and the load beam, or is integrated in the load beam, to provide a resilient connection that allows the slider to pitch and roll while following the topography of the disc.

The slider has bearing surfaces which face the disc surface. As the disc rotates, the disc drags air under the slider and along the bearing surfaces in a direction that is approximately parallel to the tangential velocity of the disc. As the air passes beneath the bearing surface, air compression along the airflow path causes the air pressure between the disc and the bearing surfaces to increase, which creates a hydrodynamic lifting force that counteracts the pre-load force and causes the slider to lift and "fly" above or in close proximity to the disc surface.

Typical sliders include a pair of raised side rails that include some of the bearing surfaces and a sub-ambient pressure cavity. As air is dragged under the slider, the bearing surfaces of the raised side rails produce positive pressure gradients relative to the top surface of the slider, which counteract the pre-load force on the slider. Additionally, air dragged under the slider is expanded in the sub-ambient pressure cavity. The expanded air in the cavity provides a self-loading force which forces the slider toward the disc surface. The counteraction between positive pressure gradients developed along the side rails and the pre-load force provided by the suspension generates an air bearing with a high vertical stiffness. When the slider reaches a steady state condition, the slider flies above the disc surface at a desired orientation relative to the disc surface such that reading and writing operations can commence.

Sliders are designed for use with both Contact Start/Stop (CSS) and ramp load or ramp load/unload disc drives. CSS disc drives operate with the slider in contact with the disc surface during start and stop operations when there is insufficient disc rotational speed to maintain the bearing that is necessary to support the slider above the disc. CSS disc drives typically provide a dedicated landing zone near the inner diameter of the disc where no data is written.

In ramp load disc drives, it is unnecessary to land the slider on the disc surface or start the slider in contact with the disc surface. Thus, one advantage to ramp load is that the dedicated landing zone can be eliminated, which increases the data storage capacity of the disc drive. Ramp load disc drives utilize a ramp that is generally adapted to hold the slider by the suspension and is typically located adjacent the outer diameter of the disc. Ramp load disc drives load the slider from the ramp above the disc surface as it rotates, which allows for the immediate formation of the bearing that supports the slider above the disc. Additionally, prior to shutting the disc drive down, the slider is unloaded from above the disc to the ramp.

During these loading and unloading operations, the bearing under the slider can be unstable. This instability can cause excessive slider pitch and roll modulation, which can cause the slider to contact the disc surface. Such contact is undesirable due to the possibility of damaging the disc surface and/or the slider, which could result in data loss and disc drive failure. Additionally, read and write operations are delayed by the unstable bearing under the slider, since they can only be reliably performed when the slider reaches a steady state flying condition.

There is a continued need for improved slider designs for disc drives. More particularly, there is a need for a slider that has reduced pitching and rolling and faster bearing stabilization during ramp load and unload operations.

SUMMARY OF THE INVENTION

The present invention relates to a slider that provides reduced pitching and rolling and faster bearing stabilization during ramp load and unload operations (hereinafter "ramp load operations"). One aspect of the invention is directed to a slider that includes a longitudinal axis, a recessed region, a bearing surface, first and second elongated rails, and first and second elongated depressions. The first and second elongated rails extend generally parallel to the longitudinal axis and are disposed about the recessed region. Each of the first and second rails include a disc-facing surface that is recessed from the bearing surface. The first and second elongated depressions extend along the first and second rails, respectively. Each depression includes a depression floor that is recessed relative to the respective disc-facing surface.

Another aspect of the invention relates to a slider that includes a longitudinal axis, a recessed region, first and second elongated rails, and a plurality of depressions formed in the first and second rails. The first and second rails are disposed about the recessed region and each includes a disc facing surface. The depressions are longitudinally displaced from each other along the respective rail. Each depression includes a floor that is recessed relative to the respective disc-facing surface. Additionally, each depression is separated from the recessed region by an inside barrier surface that extends along at least a portion of the respective rail. A portion of each depression is also separated from a side edge of the slider by an outside barrier surface that extends along the respective rail. Another portion of each depression is exposed to the outside edge of the slider through a barrier channel formed between adjacent outside barrier surfaces.

Yet another aspect of the present invention relates to a slider that includes a longitudinal axis, a leading recessed region adjacent to a leading edge of the slider, first and second elongated rails, a cross rail, and a plurality of depressions formed in the cross rail. The first and second elongated rails extend generally parallel to the longitudinal axis between the leading edge and a trailing edge of the slider. The cross rail is positioned proximate to the leading edge of the slider and adjacent to the leading recessed region. The cross rail extends transverse to the longitudinal axis and includes a disc-facing surface. The depressions formed in the cross rail each include a floor that is recessed from the disc-facing surface of the cross rail.

These and other features as well as advantages which characterize the present invention will be apparent upon reading the following detailed description and review of the associated drawings.

DETAILED DESCRIPTION OF ILLUSTRATIVE EMBODIMENTS

Figure 1:
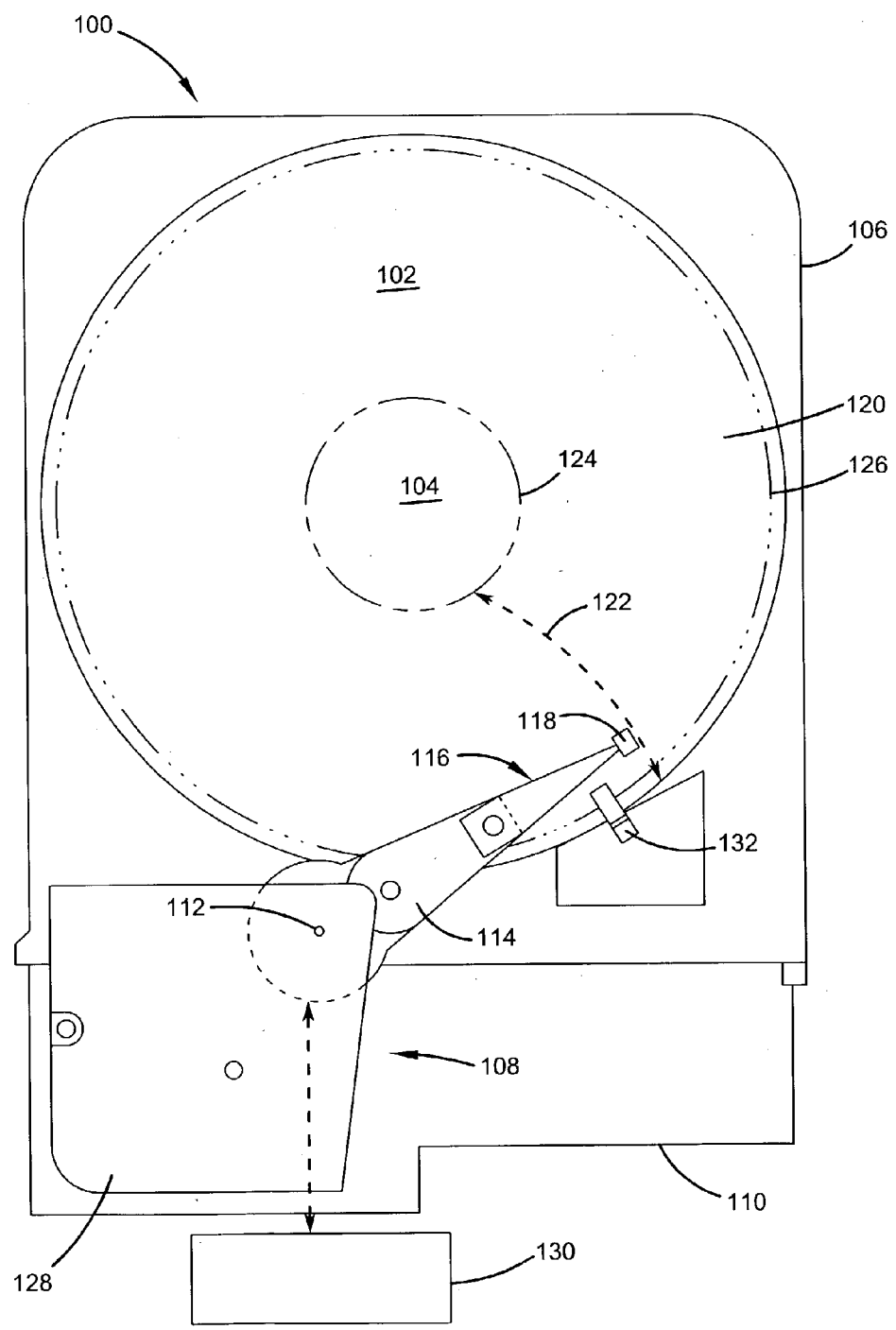
FIG. 1 is a top plan view of a disc drive in accordance with embodiments of the invention.

FIG. 1 is a top view of a ramp load disc drive 100 with which embodiments of the present invention are useful. Disc drive 100 includes a magnetic disc 102 mounted for rotational movement about an axis 104 defined by spindle of a spindle motor (not shown) that is contained within housing 106. Disc drive 100 also includes an actuator mechanism 108 mounted to a base plate 110 of housing 106 and pivotally moveable relative to disc 102 about axis 112. In an alternative embodiment, actuator mechanism 108 is a linear actuator. Actuator mechanism 108, includes actuator arm 114 and suspension assembly 116. A slider 118, formed in accordance with embodiments of the invention, is coupled to suspension assembly 116 through a gimbaled attachment. The gimbaled attachment allows slider 118 to pitch and roll as it rides on a bearing above surface 120 of disc 102. Slider 118 supports a transducer for reading and writing information on disc 102. Actuator mechanism 108 is adapted to rotate slider 118 along arcuate path 122 between an inner diameter 124 and outer diameter 126 of disc 102. A cover 128 can cover a portion of actuator mechanism 108.

A controller 130 controls actuator mechanism 108 through a suitable connection. Controller 130 can be mounted within disc drive 100 or located outside of disc drive 100. During operation, controller 130 receives position information indicating a portion of disc 102 to be accessed. Controller 130 receives the position information from an operator, from a host computer, or from another suitable controller. Based on the position information, controller 130 provides a position signal to actuator mechanism 108. The position signal causes actuator mechanism 108 to pivot about axis 112. This in turn, causes slider 118 to move radially over disc surface 120 along path 122. Once the transducer is appropriately positioned, controller 130 then executes a desired read or write operation.

During operation, as disc 102 rotates, air (and/or a lubricant) is dragged under the slider 118 and along bearing surfaces of the slider in a direction approximately parallel to the tangential velocity of disc 102. As the air passes beneath the bearing surfaces, air compression along the air flow path causes the air pressure between disc surface 120 and the bearing surfaces to increase, which creates a hydrodynamic lifting force that counteracts a pre-load force that is applied to slider 118 by suspension 116 and causes slider 118 fly above, and in close proximity to, disc surface 120.

The bearing under slider 118 that forms during ramp load operations can be unstable, which can lead to potentially damaging contact with disc 102. As discussed in more detail below with reference to FIGS. 2 and 3, slider 118 of the present invention provides improved flying characteristics during ramp load operations. In particular, some aspects of slider 118 provide improved stiffness to excessive roll and pitch modulation, which reduces the likelihood of damaging contact with disc 102. Other aspects of slider 118 operate to dampen roll and pitch modulation through quick stabilization of the bearing, which allows slider 118 to quickly reach a steady state flying condition, at which read and write operations can commence. These aspects of the present invention also provide improved performance when unstable bearings are formed due to shock loads that are applied to disc drive 100 and other conditions that destabilize the bearing under slider 118.

Figure 2:
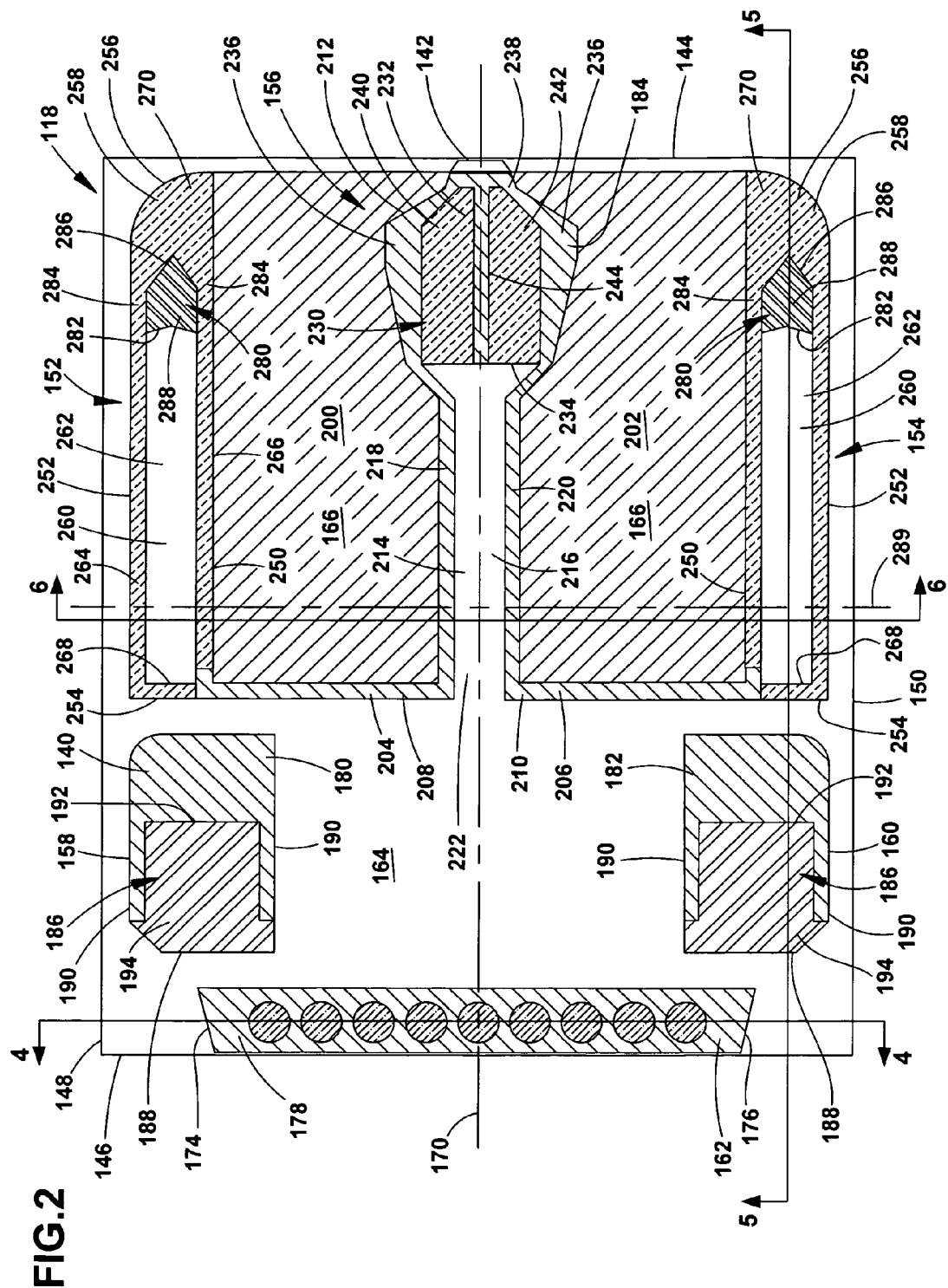
FIGS. 2 and 3 are bottom plan views of slider as viewed from a disc surface, in accordance with embodiments of the invention.
Figure 3:
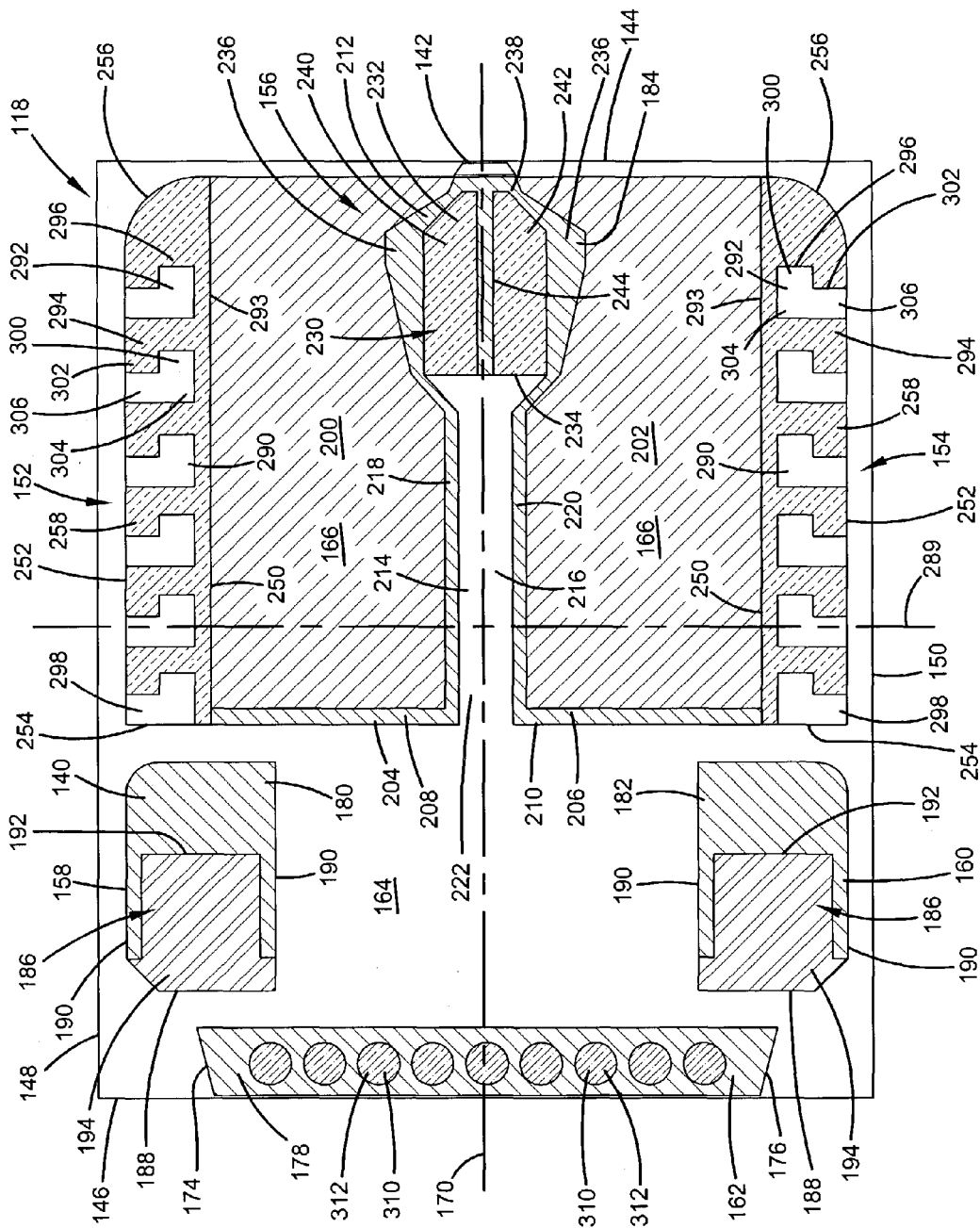
Figure 4:
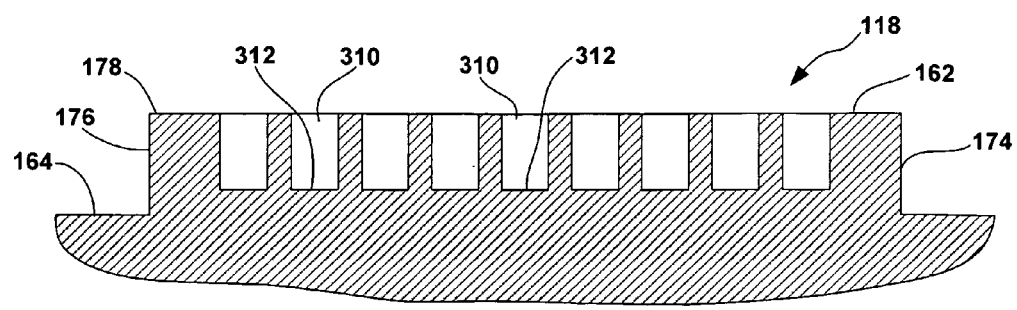
FIGS. 4–6 are partial side cross-sectional views of the slider of FIG. 2 respectively taken along lines 4—4, 5—5 and 6—6.
Figure 5:
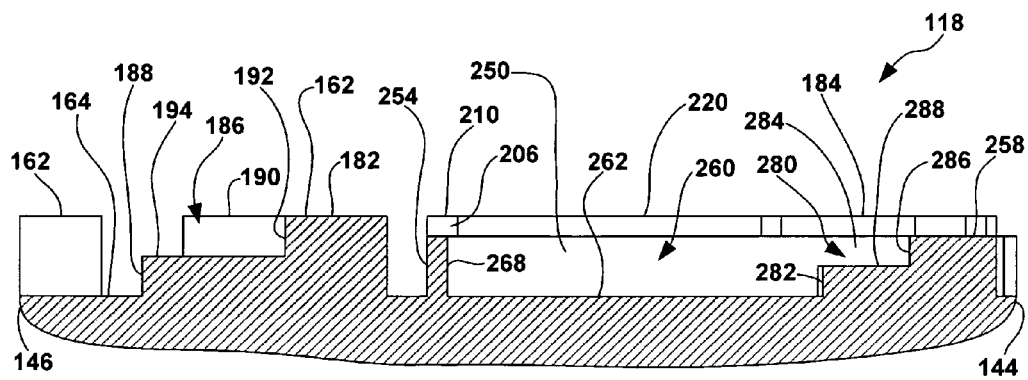
Figure 6:
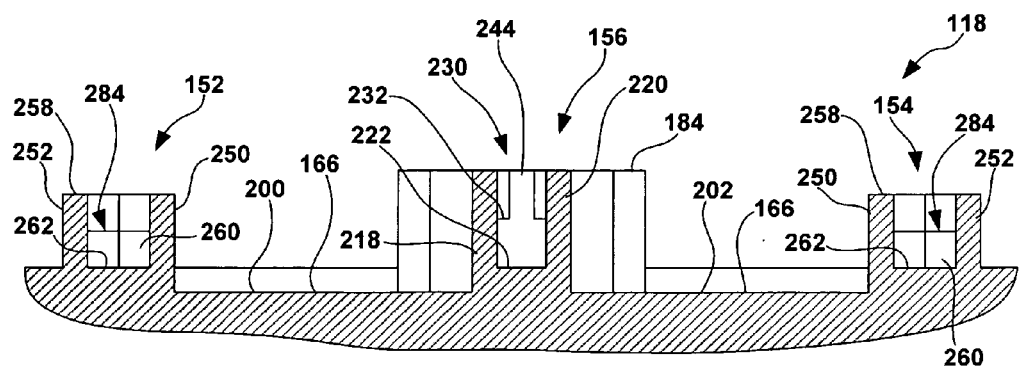

FIGS. 2 and 3 are bottom plan views of slider 118 as viewed from the disc surface 120, in accordance with embodiments of the invention. Similar elements are labeled with the same or similar reference numbers. Changes in surface shading in FIGS. 2 and 3 indicate changes in surface depth relative to a bearing surface level 140 that corresponds to bearing surfaces of slider 118. Areas on slider 118 having the same surface shading have the same or similar depths relative to bearing surface level 140.

Slider 118 is configured to carry a transducing head 142 at trailing edge 144. Transducing head 142 is preferably configured for reading data from disc 102 and writing data to disc 102 during steady-state flying conditions. The steady-state flying condition for slider 118 generally positions leading edge 146 higher than trailing edge 144. This places transducing head 142 in close proximity to disc 102 of disc drive 100.

The size of slider 118 can vary depending on its application. Slider 118 can be a "picoslider" that has, for example, a length along side edges 148 and 150 of approximately 1.25 millimeters (mm) and a width along leading and trailing edges 146 and 144 of 1.01 mm. However, slider 118 can be formed larger or smaller as desired.

Slider 118 generally includes a pair of elongated side rails 152 and 154, a center rail 156, leading pads 158 and 160, a cross rail 162, a leading recessed region 164, and a trailing recessed region 166. Trailing recessed region 166 is generally known in the art as a subambient pressure cavity, which operates to pull slider 118 toward disc 102 in response to a fluid flow. Leading recessed region 164 is located adjacent leading edge 146 and generally extends between sides 152 and 154. Leading recessed region 164 is preferably significantly recessed from bearing surface level 140, such as by 5.0 microns, for example. Cross rail 162 also creates a subambient pressure cavity at leading recessed region 164.

Cross rail 162 is preferably oriented transversely to a center line or longitudinal axis 170 and is generally symmetric about line 170. Alternatively, cross rail 162 can be offset to either side of center line 170. Cross rail 162 also includes tapered side edges 174 and 176. Cross rail 162 is positioned proximate to leading edge 146 and adjacent leading recessed region 164. Cross-rail 162 also includes a disc facing surface 178 that is raised relative to leading recessed region 164.

Leading pads 158 and 160 respectively include bearing surfaces 180 and 182 that are located at a bearing surface level 140. Additionally, center rail 156 preferably includes a bearing surface 184 that is at the bearing surface level 140.

Bearing surfaces 180, 182 and 184 can be substantially coplanar with one another and are typically defined during fabrication of slider 118 by a lapping process. Bearing surfaces 180, 182 and 184 are the primary generators of the hydrodynamic lifting force that counteracts the pre-load force applied to slider 118 by suspension 116 and causes the slider to lift and "fly" above or in close proximity to disc surface 120 as it rotates.

Other surfaces of slider 118 that are recessed from bearing surface level 140 have substantially less impact on the lifting force that is generated in response to air currents under slider 118 as compared to bearing surfaces 180, 182 and 184. In general, the more recessed a surface is from bearing surface level 140, the less lifting force that is generated by the surface. For example, surfaces that are recessed by 0.1 microns or more generally have a negligible effect on the hydrodynamic lifting force that is generated in response to the rotating disc during steady state flying conditions.

Each leading pad 158 and 160 can include a convergent channel 186 defined by a leading channel end 188, channel side walls 190, a trailing channel end 192, and a channel floor 194. Channel floor 194 is raised relative to leading recessed region 164 and recessed relative to bearing surface level 140. Channel side walls 190 generally extend from the respective bearing surface 180 or 182 and are raised relative to channel floor 194. Fluid flow entering convergent channel 186 of the leading pads 158 and 160 is bounded by channel side walls 190 and trailing channel end 192 and is forced to rise over trailing channel end 192, thereby forming a convergent channel for the flow. This creates localized positive pressure gradients on bearing surfaces 180 and 182 of leading pads 158 and 160 rearward of trailing channel ends 192.

Center rail 156 generally extends from trailing slider edge 144 to leading recessed region 164. Center rail 156 is preferably centered along center line 170. In alternative embodiments, center rail 156 can be skewed or offset with respect to center line 170. Center line 170 separates trailing recessed region 166 into a first recessed region 200 that is positioned between side rail 152 and center rail 156, and a second recessed region 202 that is positioned between side rail 154 and center rail 156. Recessed regions 200 and 202 are also defined by leading dams 204 and 206 that extend from center rail 156 to side rails 152 and 154, respectively. Leading dams 204 and 206 include disc-facing surfaces 208 and 210 that are raised relative to the respective recessed regions 200 and 202. In accordance with one embodiment, disc-facing surfaces 208 and 210 are at bearing surface level 140.

Bearing surface 184 of center rail 156 preferably includes a trailing portion 212 that is near trailing edge 144 of slider 118. Center rail 156 also includes an elongated depression 214 that includes a depression floor 216 that is recessed within center rail 156 relative to bearing surface 184. In accordance with one embodiment of the invention, floor 216 of elongated depression 214 is recessed to the same level as leading recessed region 164. Side walls 218 and 220 of center rail 156 define the elongated depression 214 and divide trailing recessed region 166 into first and second recessed regions 200 and 202. A leading end 222 of elongated depression 214 is open to receive a fluid flow from leading recessed region 164.

Center rail 156 can also include a convergent channel 230. Convergent channel 230 includes a floor 232, a leading channel end 234 that is open to fluid flow from elongated depression 214, channel side walls 236 and a trailing channel end 238 that is closed to the fluid flow from the elongated depression 214. Floor 232 is recessed within center rail 156 relative to bearing surface 184 and raised relative to floor 216 of elongated depression 214. In accordance with one embodiment, floor 232 of convergent channel 230 is recessed from bearing surface 184 by a depth of approximately 2.0 microns. Convergent channel 230 can also be divided into first and second convergent channels 240 and 242 by center wall 244 that includes a portion of bearing surface 184. Side walls 218, 220 and 236 serve as barriers to fluid flow from elongated depression 214 and recessed regions 200 and 202. This maintains a greater amount of airflow into convergent channel 230 and reduces the amount fluid flow entering recessed regions 200 and 202.

Side rails 152 and 154 are positioned adjacent side edges 148 and 150, respectively, and are disposed about trailing recessed area 200. Rails 152 and 154 extend generally parallel to lateral center line 170, from leading recessed region 164 toward trailing edge 144, and terminate prior to trailing edge 144. The term "generally parallel", as used in the specification and claims, includes rails that are parallel to center line 170 and rails that are somewhat skewed relative to center line 170.

Each rail 152 and 154 has an inside rail edge 250, an outside rail edge 252, a leading edge 254, a trailing edge 256, and a disc-facing surface 258. In accordance with one embodiment of slider 118, rails 152 and 154 each include an elongated depression 260, as shown in FIG. 2. Elongated depressions 260 extend along side rails 152 and 154 and each include a depression floor 262 that is recessed relative to the respective disc-facing surface 258. Depressions 260 are defined by outside and inside barrier surfaces 264 and 266, and a leading barrier surface 268. Inside barrier surface 266 extends along at least a portion of the respective rail and separates depression 262 from recessed region 200. Outside barrier surface 264 extends along at least a portion of the respective rail and separates depression 260 from outside edge 252 of the respective rail and the side edges 148 and 150 of slider 118. Disc-facing surface 258 generally extends over outside and inside barrier surfaces 264 and 266 and is raised relative to the floor 262 of depression 260.

Disc facing surfaces 258 of rails 152 and 154 can be substantially coplanar with one another in accordance with an embodiment of the invention. These surfaces are typically defined during a fabrication of slider 118 by a lapping process. In accordance with one embodiment of the invention, disc-facing surfaces 258 are recessed from bearing surface level 140 by, for example, 0.2 microns. Due to this recession, disc-facing surfaces 258 of rails 152 and 154 provide negligible impact to the hydrodynamic lifting force that is generated in response to the airflow beneath slider 118 during steady-state flying conditions. As a result, the bearing surfaces 180, 182 and 184 of the leading pads 158 and 160 and center rail 156 determine the fly height of slider 118 under such conditions.

However, when slider 118 rolls excessively about center line 170 in response to an unstable bearing condition, disc-facing surface 258 of the side rail 152 or 154 that is closest to the surface of disc 102 produces positive pressure gradients there between. These positive pressure gradients generate a hydrodynamic lifting force that causes slider 118 to roll in the opposite direction and prevents slider 118 from contacting disc 102. The largest positive pressure gradients occur at trailing disc-facing surface 270 of side rails 152 and 154 which is generally closest to the disc surface due to the pitch of slider 118. As a result, although side rails 152 and 154 provide little impact to the flying height of slider 118 during steady-state flying conditions due to the recessed disc-facing surface 258, they provide stiffness from excessive rolling of slider 118 during an unstable bearing condition, such as during a ramp load operation. In this manner, contact between slider 118 and disc 102 can be avoided.

In accordance with one embodiment of slider 118, side rails 152 and 154 each include a convergent channel or trench 280, that is configured to boost the positive pressure gradients that form along the respective disc-facing surfaces 258 to increase the stiffness of slider 118 from excessive roll modulation. Each convergent channel 280 is preferably recessed within a trailing disc-facing surface 270 of side rails 152 and 154, and includes a leading channel end 282, channel side walls 284, trailing channel end 286 and a channel floor 288. The term "convergent channel" includes channels having side walls 284 that are parallel, converge, or diverge, as long as flow through channels 280 is essentially bounded by channel side walls 284 and trailing channel end 280. Additionally, channels 280 of side rails 152 and 154 can be symmetrical about lateral center line 170, as shown in FIG. 2, or can be asymmetrical to provide preferential pressurization at certain slider skew angles. Each channel 280 can be formed through photolithographic processes, such as ion milling, chemical etching or reactive ion etching. With these processes, the depth and location of the channels can be accurately controlled.

In accordance with one embodiment of the invention, channel floor 288 is raised relative to elongated depression floor 262 and recessed relative to disc-facing surface 258. For example, channel floor 288 can be recessed approximately 2.0 microns from disc-facing surface 258 and raised approximately 3.0 microns from depression floor 262. Leading channel ends 282 of convergent channels 280 are open to fluid flow from depression 260. Once the fluid flow enters channels 280, the flow is essentially bounded by channel side walls 284 and trailing channel end 286 and is forced to rise over trailing channel end 286, thereby forming a "convergent end" channel for the flow. This creates localized positive pressure gradients at discrete regions on trailing disc-facing surfaces 270, that are rearward of trailing channel ends 286. However, these localized positive pressure gradients generally will only impact the flying of slider 118 during excessive rolling conditions, as mentioned above. Additionally, during excessive rolling, the localized positive pressure gradients developed along trailing disc-facing surfaces 270 yield high peak pressures that dampen roll mode vibrations at the slider's natural resident frequencies.

The size and intensity of the localized positive pressure gradient regions that are adjacent to the convergent channels 280, depend on the channel length-to-width ratio, the absolute sizes of the channels, the depth and shape of the channel floors, and the height of the column of air between the channel floor and the disc surface. In one embodiment, the ratio of channel lengths to the channel widths range from 0.5 to 5.0, but may vary outside that range depending on the design purposes of the channel feature.

One embodiment of cross rail 162 provides improved stiffness from pitch modulation by forming disc-facing surface 178 at bearing surface level 140. Such placement of a bearing surface 178, increases the pitch stiffness of slider during pitch modulation through the development of positive pressure at disc-facing surface 178 when it moves close to disc 102. The force generated in response to the positive pressure at disc-facing surface 178 can be increased or decreased by increasing or decreasing the surface area of disc-facing surface 178, respectively.

Additional embodiments of slider 118 of the present invention provide faster dampening of slider roll and pitch modulation caused by an unstable bearing. Roll modulation is where slider 118 rotates about central line 170 in an oscillatory manner and pitch modulation is where slider 118 rotates about axis 289 in an oscillatory manner. Dampening of roll and pitch modulation of slider 118 allows slider 118 to quickly reach a steady-state flying condition, in which slider 118 can perform reading and writing operations.

In accordance with one embodiment of the invention, side rails 152 and 154 each include a plurality of depressions 290 that are longitudinally displaced from each other along the respective rail, as shown in FIG. 3. Depressions 290 operate to dampen roll modulation of slider 118 by quickly stabilizing the bearing under slider 118 following a disturbance, such as a shock load to disc drive 100 or a ramp load operation. Each depression 290 includes a floor 292 that is recessed relative to the disc-facing surface 258 of the respective rail. Each depression 290 is separated from trailing recessed region 166 by an inside barrier surface 293 that extends along at least a portion of the respective rail. Additionally, most of the depressions are further defined by leading and trailing barrier surfaces 294 and 296. Each rail 152 and 154 can also include a leading depression 298 that does not include a leading barrier surface, but is exposed to the fluid flow. Additionally, portions of each depression 290, such as trailing portions 300, are separated from an outside edge 252 of the respective rail by an outside barrier surface 302 that extends along the respective rail. Another portion of each depression 290, such as leading portion 304, is exposed to outside edge 252 of the respective rail through a barrier channel 306, that is formed between adjacent outside barrier surfaces 302.

During roll modulation, slider 118, rolls first one way and then the other until the bearing under slider 118 stabilizes. During such rolling of slider 118, positive pressure gradients develop along disc-facing surface of the rail that is closest to the disc. These positive pressure gradients increase as the rail moves closer to the disc and decrease as the rail moves away from the disc. Depressions 290 operate to provide low pressure regions just down stream of the convergent channel trailing barrier surface 296 by producing a very localized suction cavity while allowing more fluid to enter each depression 290 through barrier channels 306 to the outside edge 252 to increase the positive pressure created by each convergent channel. This enhancement and isolation of the positive pressure gradients causes the bearing to stabilize much more quickly than would be possible without depressions 290. This allows slider 118 to quickly reach a steady state flying condition following a bearing disturbance and return to performing reading and writing operations.

In accordance with one embodiment of the invention, cross rail 162 includes a plurality of depressions 310 formed therein, as shown in FIGS. 2 and 3. Depressions 310 operate to dampen pitch modulation of slider 118 by quickly stabilizing the bearing under slider 118 following a disturbance, such as a shock load to disc, drive 100, or a ramp load operation. Depressions 310 are displaced along cross rail 162 and include a floor 312 that is recessed from disc-facing surface 178 of cross rail 162 and is raised relative to leading recessed region 164. In accordance with one embodiment of the invention, each depression 310 is recessed 0.2 microns from disc-facing surface 178, which is preferably at bearing surface level 140.

As discussed above with respect to depressions 290 of side rails 152 and 154, depressions 310 of cross rail 162 operate to isolate and increase the magnitude of localized positive pressure gradients on disc-facing surface 178 of cross rail 162. In this manner, the bearing under slider 118 can be stabilized more quickly than would be possible without depressions 310 which results in quicker stabilization of pitch modulation of slider 118. This allows slider 118 to quickly reach a steady state flying condition following a bearing disturbance and return to performing reading and writing operations.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A slider comprising:
    a longitudinal axis;
    a recessed region;
    at least one air bearing surface for generating a lifting force;
    first and second elongated rails extending generally parallel to the longitudinal axis and being disposed about the recessed region, the first and second rails each including a media-facing surface which are recessed relative to the air bearing surface; and
    first and second elongated depressions formed-in and extending along at least a portion of the first and second rails, respectively, and each having a depression floor that is recessed relative to the respective media-facing surface.

2. The slider of claim 1, wherein the first and second elongated rails respectively include the first and second elongated depressions.

3. The slider of claim 1, wherein the first and second rails each comprise:
    an inside barrier surface that extends along at least a portion of the respective rail and separates the respective depression from the recessed region; and
    an outside barrier surface that extends along at least a portion of the respective rail and separates the respective depression from a side edge of the slider, wherein the inside and outside barrier surfaces are raised relative to the depression floor, but recessed relative to the bearing surface.

4. The slider of claim 1, including a third elongated rail extending generally parallel to the longitudinal axis between the first and second elongated rails, and separating the recessed region into a first recessed region that is positioned between the first and third elongated rails and a second recessed region that is positioned between the second and third elongated rails, wherein the third elongated rail includes the bearing surface.

5. The slider of claim 1 including first and second convergent channels that are recessed within the first and second rails, respectively, relative to the respective media-facing surfaces, the first and second convergent channels include a leading channel end open to fluid flow from the first and second depressions, respectively, channel side walls and a trailing channel end that is closed to the fluid flow.

6. The slider of claim 5 including a third elongated rail extending generally parallel to the longitudinal axis, between the first and second elongated rails, and separating the recessed region into a first recessed region that is positioned between the first and third elongated rails and a second recessed region that is positioned between the second and third elongated rails, wherein the third elongated rail includes the bearing surface, a third elongated depression that is recessed within the third elongated rail relative to the bearing surface, and a third convergent channel that is recessed within the third rail relative to the bearing surface and includes a leading channel end open to fluid flow from the third depression, channel side walls and a trailing channel end that is closed to the fluid flow from the third depression.

7. The slider of claim 1, wherein at least one of the bearing surfaces is formed by a leading bearing surface that is proximate a leading edge of the slider and is displaced from the first and second rails.

8. The slider of claim 7, wherein the leading bearing surface is at least partially surrounded by a leading recessed region that is adjacent a leading edge of the slider and is recessed from the recessed region.

9. The slider of claim 1 including a cross rail proximate to a leading edge of the slider, the cross rail extending transverse to the longitudinal axis and having a media-facing surface.

10. The slider of claim 9 including a plurality of depressions formed in the cross rail, each depression having a floor that is recessed from the media-facing surface of the cross rail.

11. The slider of claim 10, wherein the media-facing surface of the cross rail forms the bearing surface.

12. A slider comprising:
    a longitudinal axis;
    a recessed region;
    at least one air bearing surface for generating a lifting force;
    first and second elongated rails extending generally parallel to the longitudinal axis and being disposed about the recessed region, the first and second rails each including a media-facing surface which are recessed relative to the air bearing surface; and
    a plurality of rail depressions formed in each of the first and second rails that are longitudinally displaced from each other along the respective rail.

13. The slider of claim 12, wherein each rail depression includes a floor that is recessed relative to the respective media-facing surface and separated from the recessed region by an inside barrier surface that extends along at least a portion of the respective rail, a portion of each rail depression being separated from a side edge of the slider by an outside barrier surface that extends along the respective rail, and another portion of each rail depression being exposed to the side edge of the slider through a barrier channel formed between adjacent outside barrier surfaces.

14. The slider of claim 13, wherein the portion of each rail depression that is separated from the side edge of the slider by the outside barrier surfaces is at a trailing side of the rail depression.

15. The slider of claim 12, wherein the plurality of rail depressions includes a leading rail depression positioned adjacent a leading edge of one of the rails, the leading rail depression having an open leading side.

16. The slider of claim 12 including:
    a third elongated rail extending generally parallel to the longitudinal axis, between the first and second elongated rails, and separating the recessed region into a first recessed region, that is positioned between the first and third elongated rails and a second recessed region that is positioned between the second and third elongated rails, wherein the third elongated rail includes a bearing surface; and the media-facing surfaces of the first and seconds rails are recessed from the bearing surface.

17. The slider of claim 12 including a cross rail proximate to a leading edge of the slider, the cross rail extending transverse to the longitudinal axis and having a media-facing surface.

18. The slider of claim 17 including a plurality of depressions formed in the cross rail, each depression having a floor that is recessed from the media-facing surface of the cross rail.

19. The slider of claim 18, wherein the media-facing surface of the cross rail forms a bearing surface.

20. A slider comprising:
a longitudinal axis;
a leading recessed region adjacent a leading edge of the slider;
first and second elongated rails extending generally parallel to the longitudinal axis between the leading edge and a trailing edge of the slider;
a cross rail proximate to the leading edge adjacent the leading recessed region and having a media-facing surface, the cross rail extending transverse to the longitudinal axis and being discontinuous from the first and second rails; and
a plurality of depressions formed in the cross rail, each depression having a floor that is recessed from the media-facing surface of the cross rail.

21. The slider of claim 20, wherein the media-facing surface of the cross rail is a bearing surface.

22. The slider of claim 20, wherein the leading recessed region extends between the cross rail and a leading edge of the first and second rails.

23. The slider of claim 20 including:
a bearing surface;
wherein the first and second rails are disposed about a trailing recessed region and each include a media-facing surface that is recessed relative to the bearing surface and raised relative to the trailing recessed region.

24. The slider of claim 23 including first and second elongated depressions extending along the first and second rails, respectively, and each having a depression floor that is recessed relative to the respective media-facing surface.

25. The slider of claim 24, wherein the first and second rails each include:

an inside barrier surface that extends along at least a portion of the respective rail and separates the respective elongated depression from the trailing recessed region; and
an outside barrier surface that extends along at least a portion of the respective rail and separates the respective elongated depression from a side edge of the slider, wherein the inside and outside barrier surfaces are raised relative to the depression floor, but recessed relative to the bearing surface.

26. The slider of claim 24 including first and second convergent channels, which are recessed within the first and second rails, respectively, relative to the respective media-facing surfaces, and comprise a leading channel end open to fluid flow from the first and second elongated depressions, respectively, channel side walls and a trailing channel end closed to the fluid flow.

27. The slider of claim 23 including a third elongated rail extending generally parallel to the longitudinal axis between the first and second elongated rails and separating the trailing recessed region into a first recessed region that is positioned between the first and third elongated rails and a second recessed region that is positioned between the second and third elongated rails, wherein the third elongated rail includes the bearing surface.

28. The slider of claim 23 including a plurality of rail depressions formed in the first and second rails that are longitudinally displaced from each other along the respective rail, each rail depression having a floor that is recessed relative to media-facing surfaces of the respective rails and separated from the trailing recessed region by an inside barrier surface that extends along at least a portion of the respective rail, a portion of each rail depression being separated from a side edge of the respective rail by an outside barrier surface that extend along the respective rail and another portion of each rail depression being exposed to the side edge of the slider through a barrier channel formed between adjacent outside barrier surfaces.

29. The slider of claim 20, wherein the depressions are separated from leading and trailing sides of the cross rail by leading and trailing barrier surfaces, respectively.

30. The slider of claim 20, wherein the depressions are cylindrical.

* * * * *